United States Patent [19]
Koga

[11] 4,202,011
[45] May 6, 1980

[54] TELEVISION SIGNAL CODER

[75] Inventor: Toshio Koga, Tokyo, Japan

[73] Assignee: Nippon Electric Co., Ltd., Tokyo, Japan

[21] Appl. No.: 865,147

[22] Filed: Dec. 28, 1977

[30] Foreign Application Priority Data

Dec. 28, 1976 [JP] Japan .................................. 51-158290

[51] Int. Cl.$^2$ .............................................. H04N 7/12
[52] U.S. Cl. ........................................ 358/136; 375/28
[58] Field of Search ....................... 358/136, 133, 135; 340/347 AD, 347 DD; 325/38 B; 179/15.55

[56] References Cited

U.S. PATENT DOCUMENTS

2,921,124  1/1960  Graham .............................. 358/133

OTHER PUBLICATIONS

J. C. Candy et al., "Transmitting Television as Clusters of Frame-to-Frame Difference", Bell System Tech. Journal, vol. 50, No. 6, 7-8/71.

*Primary Examiner*—Benedict V. Safourek
*Assistant Examiner*—Edward L. Coles
*Attorney, Agent, or Firm*—Sughrue, Rothwell, Mion, Zinn and Macpeak

[57] ABSTRACT

A television signal coder of the type which makes use of correlations to compress the amount of information transmitted. n fields are selected for every m fields (m, n being positive integers; m>n), and a predicted signal level for each picture element in the n fields is represented by an interpolated value of the respective spatially corresponding picture elements in the preceding and succeeding fields. The prediction error which is the difference between the interpolated value and each corresponding picture element is coded and transmitted. The signal for the remaining (m−n) fields are coded and transmitted according to conventional coding systems.

6 Claims, 6 Drawing Figures

TELEVISION SIGNAL CODER

BACKGROUND OF THE INVENTION

The present invention relates to a television signal coder for encoding a television signal making use of correlations to compress the amount of information to be transmitted.

An example of the prior art systems for the transmission of a television signal by reduced amount of information based on the frame-to-frame correlarion is shown in an article by J. C. Candy et al entitled "Transmitting Television as Clusters of Frame-to-Frame Differences" published in the *THE BELL SYSTEM TECHNICAL JOURNAL,* July-August, 1971, pp 1889–1917. In this transmission system, the frame-to-frame difference, i.e., the difference in signal level between a picture element of one frame and that of the immediately preceding frame is derived and transmitted only when it is significant compared with a predetermined threshold value. Because of the high frame-to-frame correlation inherent to a television picture signal, this system makes it possible to reduce the amount of information to be transmitted significantly. However, when the signal is picked up from a fast changing subject, the frame-to-frame correlation is lowered, resulting in the increase of the amount of information to be transmitted. This may be overcome by quantizing the frame-to-frame differences and making the quantizing levels variable depending on the rate of the change in the image to be picked up.

However, the broadening of the quantization width results in a degradation of the quality of the reproduced picture with a granular noise appearing over the entire picture. This problem is avoided only by increasing the number of quantizing levels.

SUMMARY OF THE INVENTION

Therefore, the object of the present invention is to provide a television signal coder capable of reducing the amount of information to be transmitted without causing degradation of picture quality.

In the television signal coder according to the present invention, n fields are selected for every m fields (m, n being positive integers; m > n), and a predicted signal level for each picture element in the n fields is represented by an interpolated value of the respective spatially corresponding picture elements in the preceding and succeeding fields. The difference between the interpolated value and each corresponding picture element, i.e. the prediction error, is coded and transmitted as a generated information among the n fields. The signals for the remaining (m−n) fields are coded and transmitted according to any one of the coding systems based on the frame-to-frame difference, field-to-field difference and inter-frame difference. With regard to the coding system to be employed, no limitation is imposed.

According to the present invention, for n selected fields, a prediction value is derived from the preceding and succeeding fields by interpolation. Compared with the conventional frame-to-frame prediction based on the signal in the past, the prediction error is reduced and the coding efficiency is enhanced. In addition, the coding system according to the present invention finds a broad practical application because the invention is applicable regardless of whether the input television signal is a monochromatic signal or an NTSC color signal.

BRIEF DESCRIPTION OF THE DRAWINGS

Now the present invention will be described in greater detail with reference to the accompanying drawings, in which.

DESCRIPTION OF THE PREFERRED EMBODIMENT

Figure 1:
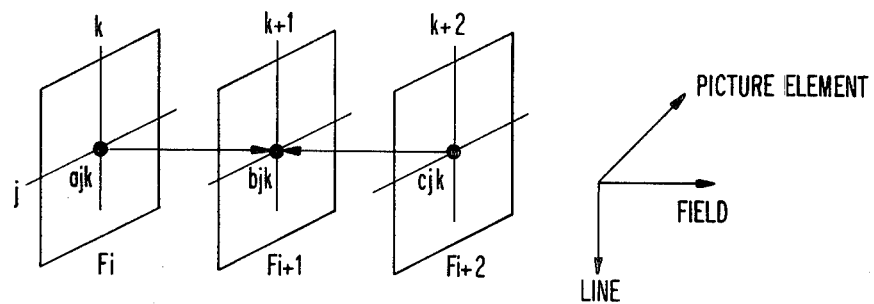
FIG. 1 shows the principle of the technique for deriving one field from two adjacent fields by interpolation.
Figure 2:
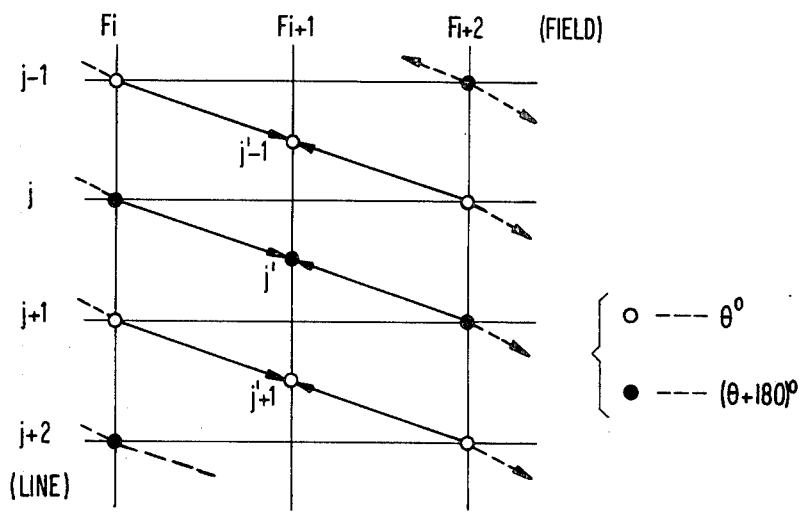
FIG. 2 shows field-to-field and line-to-line phase relations of a color subcarrier of a television picture signal for the NTSC system.

For simplicity of explanation, in FIG. 1 it is assumed that m=2 and n=1, where for every other field an interpolated value is used as the prediction value. As a prediction value for a picture element $b_{jk}$ (indicating that the element is the k-th picture element in the j-th line) in the (i+1)-th field $F_i+1$, $(a_{jk}+c_{jk})/2$ is used, and after quantization has been executed on the difference $b_{jk}-(a_{jk}+c_{jk})/2$ as a prediction error and code-conversion has been achieved, transmission is carried out while adding positional and synchronizing information, for example, to every line. Since the phase of the color sub-carrier for an NTSC television picture signal is reversed for every two successive frames and for every two neighboring horizontal lines as shown in FIG. 2, two horizontal lines having their line numbers deviated by 1 in the field $F_i$ and $F_{i+2}$, respectively, such as the (j−1)-th line in the field $F_i$ and the j-th line in the field $F_{j+2}$, the j-th line in the field $F_i$ and the (j+1)-th line in the field $F_{i+2}$, . . . are employed to derive prediction values for the lines in the field $F_{i+1}$ where the phase of the respective color sub-carrier is coincident with that on the first-mentioned two horizontal lines. Accordingly, the prediction value for $b_{jk}$ is equal to $(a_{jk}+c_{(j+1)k})/2$. It is a matter of course that this prediction value of $(a_{jk}+c_{(j+1)k})/2$ with regard to the NTSC color signal is equally applicable to a black and white television signal. It is to be noted in FIG. 2 that the symbol ○ represents that the phase of the color sub-carrier is $\theta$ while, the symbol ● represents that the phase is $(\theta+180°)$.

Now a preferred embodiment of the present invention assuming m=2 and n=1 will be explained referring to FIG. 3.

A digitized television signal is applied to a field memory 102 (FM2) which is capable of storing at least one field of television signal, and to side-b of a switch 112. The output of the memory 102 is applied to side-a of the switch 112 and to subtractor 107 via lines 212 and 207, respectively. Side-a inputs of switches 112, 113 and 114 are selected upon frame-to-frame coding which makes use of a field memory 101 (FM1), whereas side-b inputs thereof are selected upon the coding which makes use of a prediction value derived from two adjacent fields by interpolation.

The output of the switch 112 is applied to a subtractor 103, where the difference between said output and the output of memory 101 fed through a line 103 is derived. The output of the subtractor 103 is fed to a quantizer 104 to be quantized, and the quantizing characteristics are appropriately varied in accordance with the command signal supplied from a buffer memory monitor 111 through a line 1114. The quantizers 104 and 108 may be of the type disclosed in U.S. Pat. No. 4,077,053. The output of the quantizer 104 is applied to side-a of the switch 114 and to an adder 105 via lines 414 and 405, respectively. In the switch 114, either the signal applied to the side-b after the quantization of the output of the subtractor 107 by the quantizer 108 or the signal applied to the side-a through the line 414 is selected depending upon which one of the coding employing interpolated values and the frame-to-frame coding between two fields is executed.

The adder 105 produces a locally decoded signal in the frame-to-frame coding by taking the sum of the signals applied through lines 405 and 1105, and the output is applied to the side-a of the switch 113 and to an interpolator circuit 106 through lines 513 and 506, respectively. In the switch 113, the side-a input is selected for the frame-to-frame coding, while the side-b input is selected for the coding employing interpolated values between two fields. The output of the switch 113 is fed to the memory 101. In the interpolator 106, interpolated values are calculated from the signals of two fields fed through lines 1106 and 506, respectively, and the result is applied to the subtractor 107.

Figure 4:
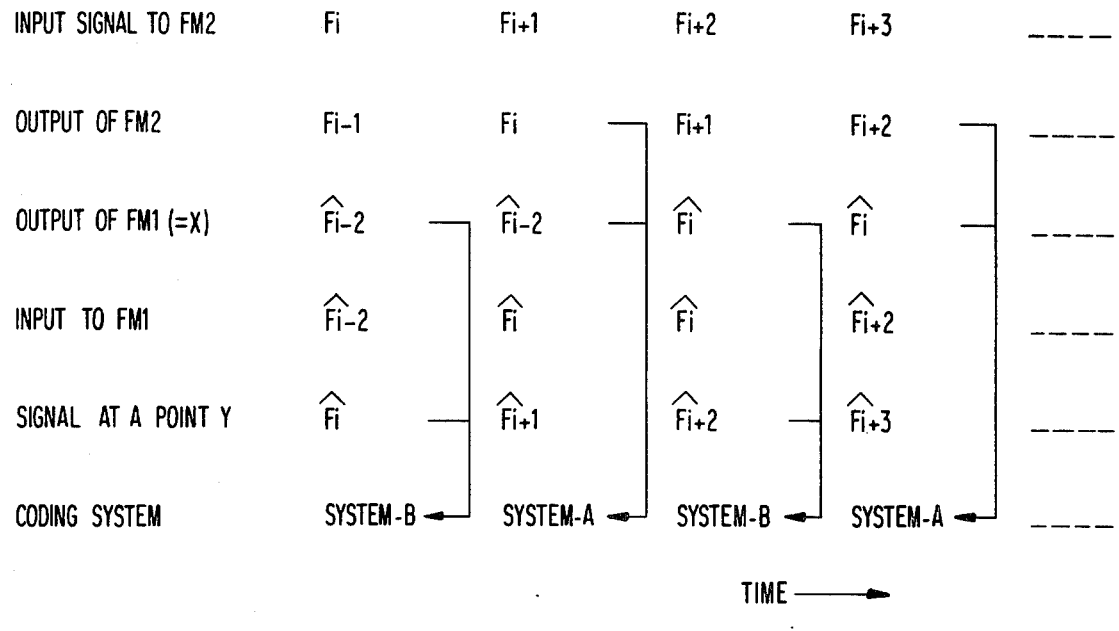
FIG. 4 shows a mode of switching between frame-to-frame coding (system-A) and coding employing an average value between two fields (system-B)

Here, description will be given with reference to FIG. 4 on the switching between the frame-to-frame coding (hereinafter referred to as system-A) and the coding employing interpolated values between two fields (hereinafter referred to as system-B).

Figure 3:
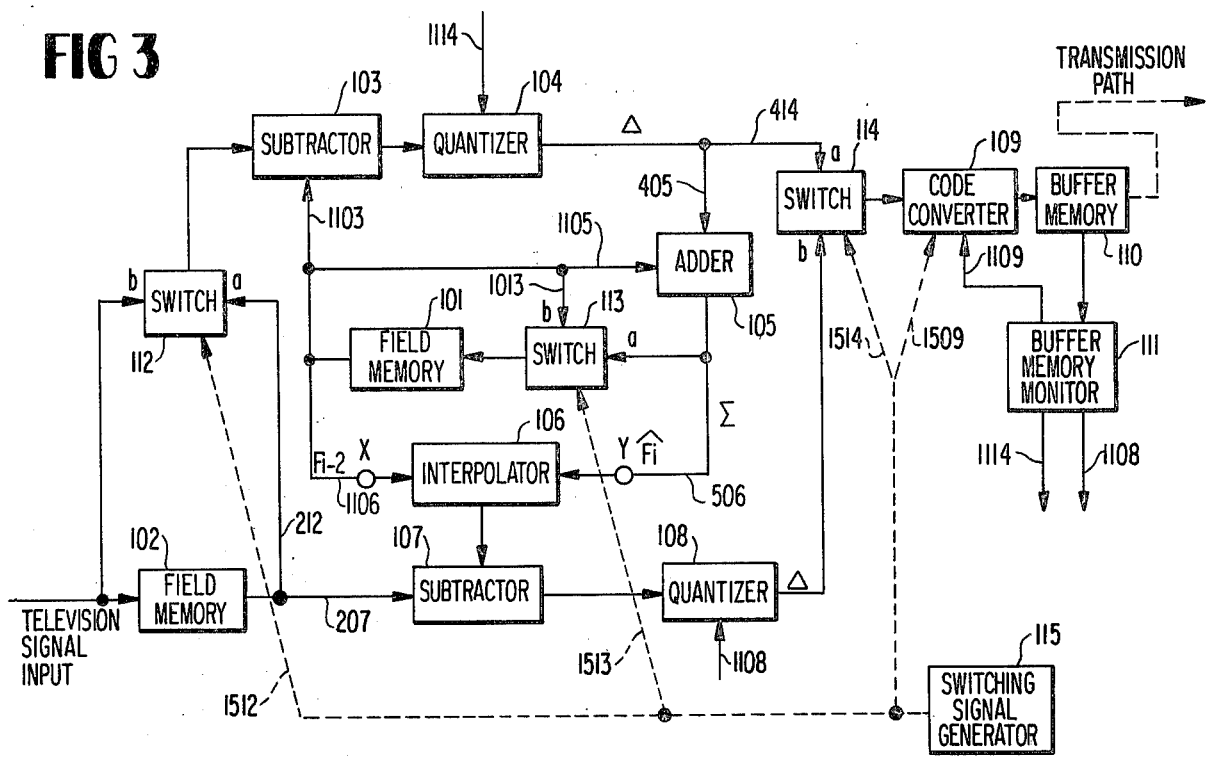
FIG. 3 is a block diagram of one preferred embodiment of the present invention.

When the input signal to the memory 102 is for the i-th field $F_i$ (hereinafter abbreviated simply as $F_i$), the signal at a point Y in FIG. 3 is a signal $\hat{F}_i$ which is derived by executing the coding of system-A between the output $\hat{F}_{i-2}$ of the memory 101 (the symbol '$\wedge$' representing a signal processed and thereafter locally decoded) and $F_i$ and thereafter locally decoding the same, so that the interpolator circuit 106 receives signals $\hat{F}_i$ and $\hat{F}_{i-2}$. At this time point, i.e., when the system-B coding is to be executed, all the switches 112, 113 and 114 select the side-b. Subsequently, when the input signal is turned to $F_{i+1}$, the output of the memory 102 is $F_i$, then the system-A coding is executed between this output $F_i$ and the output $\hat{F}_{i-2}$ of the memory 101, and the switch 113 is controlled so that the locally decoded signal $\hat{F}_i$ at this point in time may be applied to the memory 101. In other words, upon execution of the system-A coding, all the switches 112, 113 and 114 select the side-a. Thereafter, the same operation is repeated for the input signals $F_{i+2}$, $F_{i+3}$, . . . .

Figure 5:
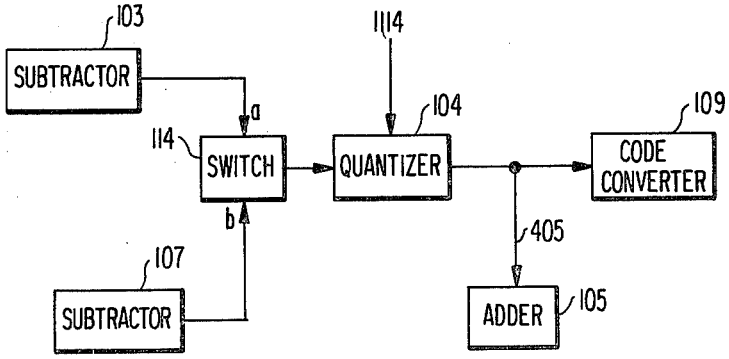
FIG. 5 shows one example of a modification of the preferred embodiment with quantizer 108 omitted and with quantizing characteristics of two quantizers 104 and 108 assumed to be identical.

Referring again to FIG. 3, the output of the switch 114 is fed to a code converter 109 for coding the generated information. The code converter 109 may correspond to the encoder 25 shown in FIG. 1 of U.S. Pat. No. 3,439,753. The output of the code-converter 109 is fed to a buffer memory 110 for the purpose of transmission speed matching with a transmission path. The state of the buffer memory 110 is monitored by a buffer memory monitor 111, and the quantization characteristics of the quantizers 104 and 108 are modified in accordance with the state of the buffer memory. The modification command is fed to the respective quantizers 104 and 108 through lines 1114 and 1108, respectively. In addition, an information representing quantization characteristics then used is fed to the code-converter 109 through line 1109. It is to be noted that the quantization characteristics of the quantizers 104 and 108 may be of the same type. The construction of the coder may be simplified accordingly. More particularly, as shown in FIG. 5, the outputs of the subtractors 103 and 107 are applied to the side-a and side-b, respectively, of the switch 114. The output of the switch 114 is applied to the quantizer 104, where output is fed to the adder 105 and the code-converter 109. By such modification, the quantizer 108 in FIG. 3 can be omitted.

A switching signal for selecting either the frame-to-frame coding or the coding making use of interpolated values between two fields in the switches 112, 113 and 114, is fed from a switching signal generator 115 to these switches through lines 1512, 1513 and 1514, respectively. At the same time, the same signal is fed to the code-converter 109 via a line 1509 to designate whether the used coding is of system-A or of system-B.

In the above description of the preferred embodiment, frame-to-frame coding is employed for the coding of the (m−n) fields. However, inter-frame coding can be used also.

The preferred embodiment may be modified to correspond to the case where m=4 and n=2. With regard to the coding in which frame-to-frame coding and coding making use of interpolated values between adjacent two frames are executed alternately in each of the successive frames, the above description is also applicable by merely rewriting "field" or "field memory" in the description for the first preferred embodiment and in FIG. 3 to "frame" or "frame memory", and by rewriting "frame-to-frame" in FIG. 4 to "between-every-second-frame".

Figure 6:
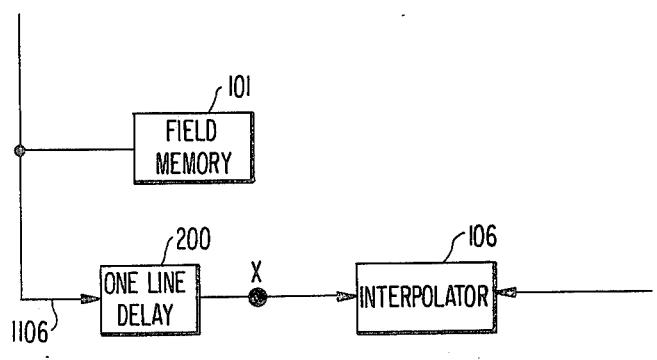
FIG. 6 shows another modification of the first preferred embodiment adapted to an NTSC television picture signal.

The preferred embodiment may also be modified to correspond to the case where the input signal is an NTSC color signal. In this case, since the phase of the color signal subcarrier is reversed with respect to two neighboring lines and between successive frames as shown in FIG. 2, the j-th line in $F_i$, and the (j+1)-th line in $F_{i+2}$ are employed in the coding of system B upon calculating interpolated values for the j-th line in $F_{i+1}$. In FIG. 2, the markings ○ and ● represent the lines on which the phase of the color signal subcarrier is $\theta$ and $(\theta+180°)$, respectively. More particularly, it is only necessary to use the j-th line in $F_i$ and the (j+1)-th line in $F_{i+2}$, and so, in this case the addition of one circuit element as shown in FIG. 6 is effected to the circuit shown in FIG. 3. More particularly, at the point X in FIG. 3 there is additionally provided a one-line delay circuit 200. With regard to the coding of system-A according to FIG. 2, since the (j−1)-th line in $\hat{F}_i$ which has been delayed by the dely circuit 200 at the point X corresponds to the j-th line in $F_{i+2}$, the phase of the color signal subcarrier on these lines coincide with each other, whereby the frame-to-frame coding can be executed. The same applies to the subsequent lines.

What is claimed is:

1. A television signal coder for coding a television signal by making use of correlation, said television signal consisting of a series of fields each representing a number of two-dimensionally arranged picture elements of an optical image to be transmitted, said coder comprising:
- means for selecting n fields of said television signal among every m fields of said television signal, said m and n being positive integers, said n being less than said m;
- means for deriving an array of interpolated values corresponding to the interpolation between said picture elements of preceding and succeeding fields adjacent to said selected n fields
- first coding means for coding the difference between the television signal level in said selected n fields and said interpolated values;
- second coding means for coding the television signal in the (m−n) fields consisting of said m fields excluding said selected n fields; and
- means for code-converting the outputs of said first and second coding means.

2. The television signal coder recited in claim 1, further comprising first and second field memories each capable of storing at least one field of television signal, said first field memory storing in succession said selected n fields and said second field memory storing in succession at least said (m−n) fields and decoding means connected between the output of said second coding means and the input of said first field memory for periodically updating the content of said first field memory, said means for deriving interpolated values receiving as inputs the outputs of said first field memory and said decoding means, and said first coding means receiving as inputs the outputs of said second field memory and said means for deriving interpolated values.

3. The television signal coder recited in claim 2, wherein said first and second coding means comprise first and second subtractors, respectively, and wherein said selecting means includes a first switch for selectively applying either the input or the output of said second field memory to one input of said second subtractor, the other input of said second subtractor being supplied by the output of said first field memory.

4. The television signal coder recited in claim 3, wherein said first and second coding means further comprise first and second quantizers, respectively, and wherein said selecting means further includes a second switch for selectively coupling the outputs of either of said first or second quantizers to said code-converting means.

5. The television signal coder recited in claim 3, wherein said first and second coding means further comprise a common quantizer and wherein said means for selecting further includes a second switch for selectively coupling the outputs of either of said first or second subtractors to said common quantizer.

6. The television signal coder recited in claim 2, further comprising delay means connected between the output of said first field memory and one input of said means for deriving an interpolated value, said delay means providing a one line delay.

* * * * *

UNITED STATES PATENT AND TRADEMARK OFFICE
CERTIFICATE OF CORRECTION

PATENT NO. : 4,202,011
DATED : May 6, 1980
INVENTOR(S) : Toshio Koga

It is certified that error appears in the above-identified patent and that said Letters Patent are hereby corrected as shown below:

IN THE SPECIFICATION:

Column 1, line 12 - Delete "correlarion" insert --correlation--.
See appl. page 1, line 6.

Column 2, line 22 - After "of the" delete "first"

Column 3, line 6 - Delete "103" insert --1103-- line 53 - Delete "$F_i$" insert --$\hat{F}_i$-- line 55 - "     "     "     "

IN THE CLAIMS:

Column 5, line 10 - after "fields" insert -- ; --

Signed and Sealed this

Eighteenth Day of November 1980

[SEAL]

Attest:

Attesting Officer

SIDNEY A. DIAMOND

Commissioner of Patents and Trademarks